United States Patent [19]
Kurichh et al.

[11] 3,926,094
[45] Dec. 16, 1975

[54] AIR OPERATED SPRING BRAKE

[75] Inventors: Sham L. Kurichh, Owosso; Leon R. Acre, Ovid, both of Mich.

[73] Assignee: Midland-Ross Corporation, Cleveland, Ohio

[22] Filed: July 2, 1973

[21] Appl. No.: 375,622

[52] U.S. Cl. .................. 92/63; 92/64; 92/100; 92/101; 92/130 A; 92/167; 92/168; 308/72
[51] Int. Cl.² .......................................... F01B 7/16
[58] Field of Search .......... 92/62, 63, 64, 130, 166, 92/168, 129, 99, 100, 101, 167; 308/72

[56] References Cited
UNITED STATES PATENTS

| 373,072 | 11/1887 | Jarvis | 92/167 X |
|---|---|---|---|
| 3,107,583 | 10/1963 | Woodward | 92/63 |
| 3,303,557 | 2/1967 | Litsky | 308/72 X |
| 3,311,030 | 3/1967 | Halstead | 92/166 X |
| 3,411,417 | 11/1968 | Swander | 92/63 |
| 3,424,062 | 1/1969 | Gummer et al. | 92/63 |
| 3,515,438 | 6/1970 | Stevenson et al. | 92/64 X |
| 3,547,004 | 12/1970 | Fowler | 92/63 |
| 3,683,754 | 8/1972 | Stuyvenberg | 308/72 X |
| 3,796,138 | 3/1974 | Doyle et al. | 92/64 X |
| 3,811,365 | 5/1974 | Gordon et al. | 92/64 X |

*Primary Examiner*—Irwin C. Cohen
*Assistant Examiner*—Abraham Hershkovitz
*Attorney, Agent, or Firm*—Irvin L. Groh

[57] ABSTRACT

An air operated spring brake which has a diaphragm upon which air acts to compress an energy storing spring in readiness to apply the brakes on a vehicle when the air pressure is released is so arranged that the push rod which links the spring through the diaphragm to the brake applying apparatus is connected to the diaphragm and supported in the spring brake actuator in a manner permitting the push rod to be displaced from its true axis upon compression and expansion of the spring so that the spring can establish its own position of equilibrium.

8 Claims, 4 Drawing Figures

AIR OPERATED SPRING BRAKE

SUMMARY OF THE INVENTION

This invention relates to fluid pressure actuators and more particularly to brake applying actuators of the spring type used with air brake systems on vehicles such as trucks.

Spring type brake applying actuators are in common use with air brake systems used on trucks, buses and towed vehicles. Such actuators normally include a service brake actuator for applying and releasing the brakes in response to delivery and exhaust of compressed air and a spring actuator disposed in tandem with the service brake actuator which uses spring force to operate the service brake actuator and apply the brakes when air in the spring actuator is reduced below some predetermined level. Air may be reduced in the spring actuator to apply the brakes under the control of the operator or automatically as a result of failure of portions of the service brake air system.

In all such actuators a large, bulky spring is used to store energy and to exert the large force required for braking. Air pressure acting on a movable wall is employed to compress the spring and maintain it in its brake released position. When the air is exhausted, the spring acts on the movable wall and through an actuating rod to exert the spring force on the service actuator to apply the brakes.

The springs are difficult to manufacture with any degree of accuracy so that the ends remain normal to the axis of the spring and so that the thrust is applied along the true axis during both compression and expansion of the spring. As a result the spring tends to exert large side loads on the various moving components with which it operates. This results in friction detracting from the capacity of the spring and also in wear of the parts which can result in air leakage and malfunctioning of the brake system. Wear of the parts due to misalignment of the spring is particularly critical at the point at which the actuating rod passes through the wall between the air pressure chamber of the spring brake actuator and the air chamber of the service brake actuator. In a released position of the combined service-spring brake actuator, the service chamber is at atmospheric pressure and the air chamber of the spring actuator is at a relatively high air pressure. This results in a large pressure differential which can cause air to leak past a worn seal or scored actuating rod from the spring actuator to the service brake actuator and to the atmosphere.

It has been the practice to use either a piston or a diaphragm to form the movable wall on which the air acts to compress the spring. When a piston is used it acts as a guide for the spring but when a diaphragm is used, separate guides or bearings are required to maintain alignment of the spring and components along the true axis during reciprocation of the spring actuator between brake applied and brake released positions. The use of pistons or guides and bearings results in added weight and cost and also introduces frictional loads detracting from the efficient use of the full capacity of the spring.

It is an object of the invention to provide a spring type air brake actuator which avoids the use of pistons and guides to maintain the spring in alignment along the true axis of the actuator.

Another object of the invention is to provide a spring brake actuator in which the spring and associated elements are allowed to find their own axis of equilibrium without restraint.

The present invention avoids the use of guides and makes it possible to use diaphragms instead of pistons by avoiding the effects of side loading with a construction which permits the spring to seek its own axis of equilibrium even though it may be displaced from the true axis, and the displacement is accommodated by the connection between the push rod and spring and by a seal acting with the rod between the spring and service brake actuator sections.

Other objects and advantages of the present invention will become apparent from the following description, the claims and the drawing disclosing a preferred embodiment of the invention.

DETAILED DESCRIPTION

Figure 1:
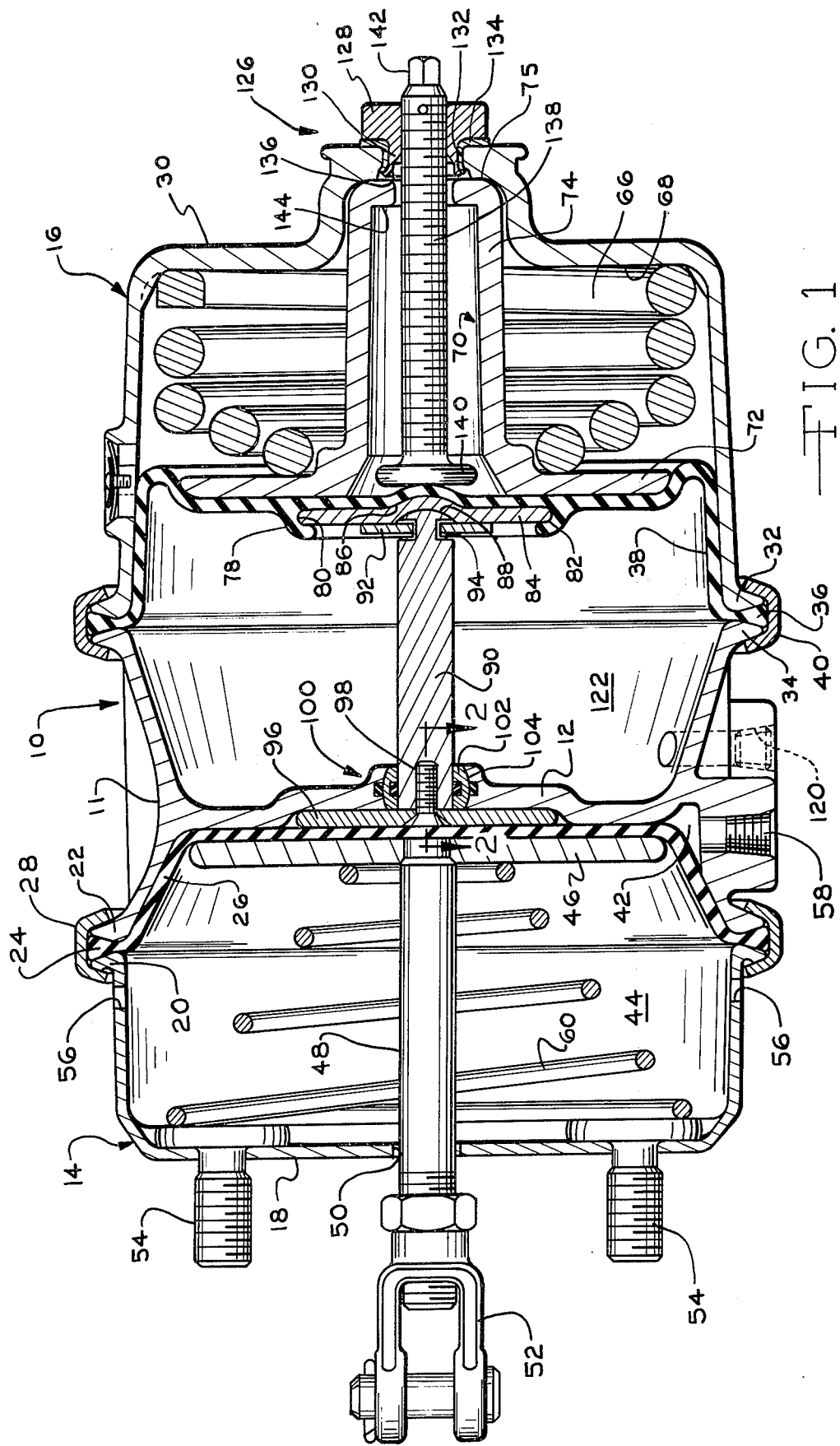
FIG. 1 is a longitudinal sectional view of an air brake spring actuator embodying the invention and shown in its brake released position.

Referring to the drawing, the combined service and spring brake actuator embodying the present invention has a housing generally designated 10 which includes a central housing member 11 having a dividing wall 12 which separates the housing 10 into a unitary service brake portion 14 and a spring brake portion 16. The service brake portion 14 includes a housing member 18 having an annular flange 20. The central housing member 11 has a complementary flange 22 which is positioned relative to the flange 20 with a bead 24 of a cup-shaped diaphragm 26 therebetween. A clamp band 28 holds the flanges 20 and 22 in tight engagement with the bead 24 and forms a fluid tight seal. In a similar manner, the spring brake section 16 includes a housing portion 30 which has an annular flange 32 complementary to an annular flange 34 formed by the central housing 11. The flanges 32 and 34 are held in a fluid tight engagement with a circumferential bead 36 of a diaphragm 38 by means of a clamp band 40 of the same type as the clamp band 28. The clamp bands 28 and 40, the complementary annular flanges of the housing portions and the beads of the diaphragms serve to connect the housing sections 18, 11 and 16 together and also form fluid tight seals as well as provide the means by which the diaphragms 26 and 38 are suspended within the housing 10.

The service brake portion 14 of the brake actuator is divided by the diaphragm 26 into a variable pressure chamber 42 at one side, and an atmospheric chamber 44 at the opposite side. Disposed within the chamber 44 is a pressure plate 46 which engages the central flat portion of the diaphragm 26. The pressure plate 46 is connected to one end of a brake actuating rod 48 as by welding, for example. The opposite end of the rod 48 protrudes through an opening 50 in the housing member 18 and is provided with a clevis 52 by which the actuating rod 48 is connected to conventional brake actuating mechanism at the wheel of a vehicle. This housing portion 18 also is provided with studs 54 by which the entire actuator 10 may be mounted on the vehicle to a bracket or the like as is well known in the art.

The housing member 18 is provided with openings 56 which maintain the chamber 44 at atmospheric pressure and the central housing section 11 is provided with a port 58 which is adapted to be connected to a service brake air line. Introduction of air through the port 58 to the chamber 42 causes the diaphragm 26 and the pressure plate 46 to move to the right from the position shown in the drawing. Such movement extends the push rod 48 through the opening 50 and serves to actuate the brakes at the wheel of the vehicle. Upon release of pressure from the chamber 42, a spring 60 returns the diaphragm 26 and pressure plate 46 to the original position and the brakes are released.

Referring now to the spring brake actuator section 16, the housing member 30 contains a relatively large, bulky spring 66 which is shown in its compressed state and which stores the energy for operating the spring actuator portion 16 of the actuator 10. One end of the spring 66 is seated against the internal wall 68 of the housing member 30 and the opposite end is seated against the spring support 70. The spring support 70 includes a push plate portion 72 and a tubular portion 74. The plate portion 72 abuts against the diaphragm 38 and an end portion 75 of the tubular portion 74 engages the internal wall 68 to limit the amount that the spring can be compressed.

The diaphragm 38 is provided with an annular, intermediate flange 78 which is molded integrally with the diaphragm and forms an internal annular groove 80 which recieves and engages the circumferential edge portion 82 of a push plate 84 and holds the latter relative to the diaphragm 38. The push plate 84 has a central concave portion 86 which is complementary to a semi-spherical end portion 88 on actuating or push rod 90. The actuating rod 90 is attached to the push plate 84 by means of a C-shaped washer 92 which fits loosely in an annular groove 94 formed in the end of the push rod 90. The C-shaped washer is rigidly fastened to the push plate 84 in any conventional manner, as by welding, for example.

The opposite end of the push rod 90 passes through the separating wall 12 between the chambers 42 and 122 and supports a push plate 96 which is connected to the rod 90 by means of a screw 98. The push plate 96 is adapted to engage the diaphragm 26 during operation of the spring actuator 16.

The push rod member 90 is slidably supported in the wall 12 by means of a bearing and seal assembly 100 which is mounted in the central wall 12.

Figure 2:
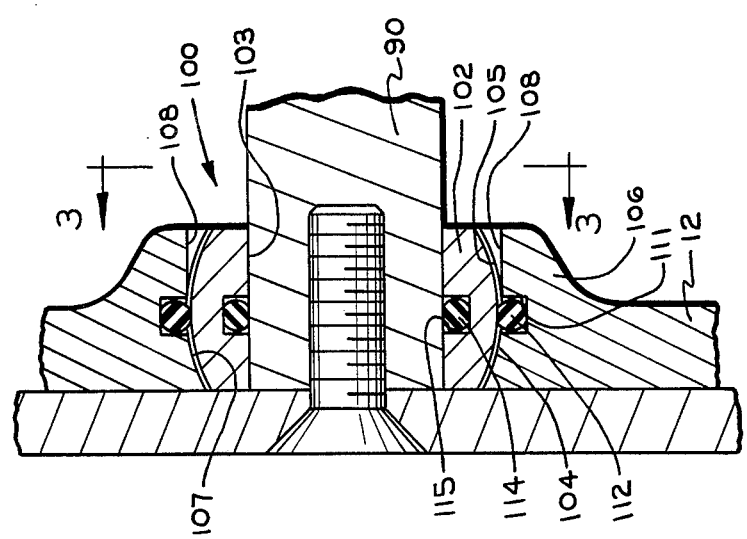
FIG. 2 is a view at an enlarged scale of a portion of the air brake spring actuator taken on line 2—2 in FIG. 1.
Figure 3:
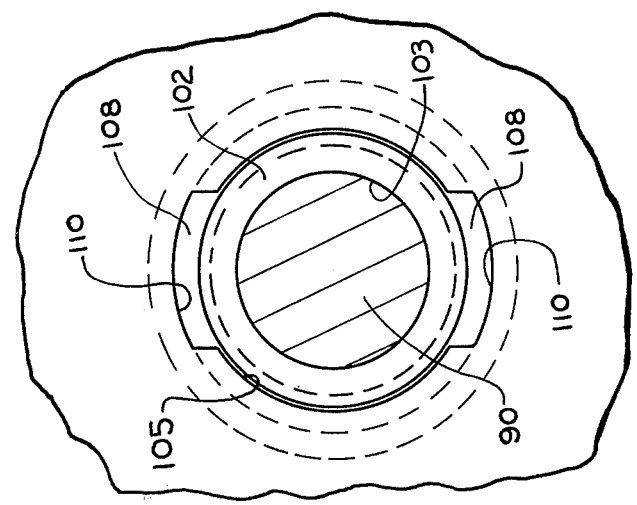
FIG. 3 is a view taken on line 3—3 in FIG. 2.

Referring now to FIGS. 2 and 3, the bearing and seal assembly 100 includes a generally flat annular ring 102 which has an opening 103 to receive the rod 90 and a spherical outer surface 104. The annular ring 102 is received in an opening 105 formed at a boss 106 on the internal separating wall 12. The opening 105 has a trough-like annular surface 107 which is generally complementary to the spherical surface 104 of the ring 102.

The opening 105 is provided with a pair of diametrically opposed slots 108 which have a width transverse to the axis of the rod 90 slightly greater than the axial thickness of the ring 102. As seen in FIG. 3 the slots also have diametrically opposed curved surfaces 110 conforming generally to the curvature of the ring 102. The two slots 108 and the space between afford an opening slightly larger than the maximum cross sectional area of the ring 102 as viewed in FIG. 2. During assembly the ring is placed in the opening 105 by positioning the ring with its axis perpendicular to and intersecting the axis of the opening 103. Thereafter the ring 102 is moved axially into the space afforded by the slots 108. When the axis of the ring 102 is axially midway of the opening 105, the ring is rotated 90 degrees about its diametric axis to the position shown in FIGS. 1 and 2. The ring 102 is held in position by the internal surface of the opening 105 to prevent displacement from the wall 12 and at the same time to permit universal tilting or pivoting of the ring 102 relative to the wall 12.

An annular groove 111 is formed in the internal surface of the opening 105 to receive an O-ring 112 which engages the spherical surface 104 to form a fluid tight seal between the wall 12 and the ring 102 for all positions that the ring 102 may assume during operation of the spring brake actuator. An O-ring 114 is disposed in a groove 115 within the opening 103 to maintain a fluid tight seal between the bearing ring 102 and the outer surface of the rod 90.

As seen in FIG. 1 the central housing section 11 is provided with a threaded port 120 which is adapted to receive a line from a supply of air in the air brake system which is separate from the air supply to the port 58. Delivery of pressurized air to the port 120 acts within a chamber 122 on the diaphragm 38 and causes the spring 66 to be compressed between the plate 72 and the internal wall 68 to the position in which it appears in the drawings. When air is released from the chamber 122, the spring 66 acts on the pressure plate 72 and pushes the diaphragm 38 as well as the push plate 84 and connecting rod 90 so that the push plate 96 engages the diaphragm 26 in the service brake section 14 and pushes the brake actuating rod 48 to operate the brakes.

A retractor mechanism is provided for manually compressing the spring 66 to release the brake in the event that a supply of air is not available for delivery to the port 120 or if chamber 122 cannot be pressurized. The retractor mechanism, indicated generally at 126 includes a nut member 128 which has a sleeve portion 130 passing through an opening 132 in the rear housing section 30. A bearing member 134 made of a plastic such as nylon is interposed between the nut 126 and the opening 132. The sleeve portion 130 is swaged as indicated at 136 to retain the nut 128 and bearing 134 within the opening 132 and still permit rotation of the nut 128. The nut 128 receives a threaded bolt 138 having a head 140 at one end and a wrench receiving head 142 at its opposite end.

Retraction of the bolt 138 relative to the nut 128 brings the head 140 into engagement with the internal wall 144 of the tubular member 74 so that the spring 66 is compressed. This can be accomplished by placing a wrench on the nut 128 and another wrench on the head portion 142 and rotating either the bolt or the nut or by rotating both in opposite directions.

During operation of the spring brake actuator section 16 to either compress the spring 66 to the position in which it is shown in the drawing or to permit the springs to expand upon depletion of air in the chamber 122, the spring 66 may tend to become misaligned from the axis of the actuator 10 and in so doing the push plate 72 and diaphragm 38 also tend to become misaligned since no means in the form of bearings or guides are provided for restraining or confining these members.

Figure 4:
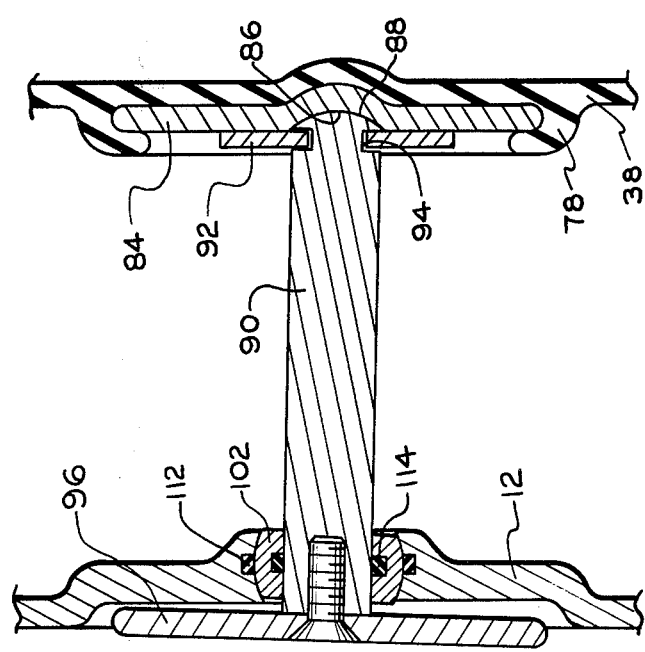
FIG. 4 is a view of a portion of the structure in FIG. 1 showing a different operational position.

However, such misalignment can be ignored since the connection between the washer 92 and the slot 94 permits the push rod 90 to assume an angle relative to the push plate 84, an example of which is shown in FIG. 4. Moreover, the complementary concave portion 86 of the push plate 84 and the semispherical end 88 of the push rod 90 afford a universal pivoting action. At the opposite end of the rod, angular movement of the rod 90 can take place about a point at the intersection of the axis of the rod 90 and a plane through the O-ring 112. Any misalignment of the connecting rod 90 from the true axis of the actuator is accommodated by the spherical surface 104 of the annular ring 102 which remains in sealing engagement with the O-ring 112 for all of the minor angular positions of the actuating rod 90 from its true axis. Since the seal 115 also remains in contact with the push rod 90 a fluid tight connection is maintained. The combination bearing and seal assembly 110 accomodates the angular displacement of the push rod 90 without being subjected to side loads or wear and as a consequence has a long useful life.

It will now be seen that a combination service and spring brake actuator having been provided in which diaphragm assemblies are used for the actuating members and in which the various axially movable parts are not restrained in any manner by bearings or guides and no attempt is made to maintain axial alignment against the force of the large spring 66. This makes both a simple and an economical construction which makes it possible to use diaphragms instead of pistons and also avoids the necessity of providing being structures and guides to avoid wear of parts and leakage of pressure fluid and which impose frictional forces detracting from the operation of the spring 66.

What is claimed is:

1. A spring operated brake actuator in combination with an air operated service brake actuator having a diaphragm movable in the presence of air pressure to actuate brakes on a vehicle, said spring operated actuator having a housing, an auxiliary diaphragm in said housing dividing the latter into a spring chamber and a fluid pressure chamber, a spring in said spring chamber acting on said auxiliary diaphragm to move the latter generally longitudinally of said housing in a brake applying direction upon a decrease in pressure in said fluid pressure chamber, said auxiliary diaphragm being movable generally longitudinally in the other direction to compress said spring in the presence of pressure in said fluid pressure chamber to allow operation of said service brake actuator independently of said spring operated actuator, a push plate in said fluid pressure chamber connected to said auxiliary diaphragm for movement with the latter, a push member extending generally longitudinally in said housing and having an end portion projecting through a wall of the latter, means connecting the other end of said push member to said plate for longitudinal movement of said push member with said plate and for universal angular displacement of said push member relative to said plate during longitudinal movement, a bearing slidably supported on said push member, and mounting means for supporting said bearing relative to said wall for universal angular displacement of said push member relative to said wall during longitudinal movement of said push member, said one end of said push member engaging the diaphragm of said service brake actuator to operate the latter in the absence of pressure in said fluid pressure chamber.

2. The spring operated brake actuator defined in claim 1 wherein the means connecting the push member to said plate includes complementary concave and convex surfaces on said plate and on said push member.

3. The spring operated brake actuator defined in claim 2 and further comprising means maintaining said concave and convex surfaces adjacent to each other during longitudinal movement of said plate and push member.

4. The spring operated brake actuator defined in claim 1 in which said auxiliary diaphragm forms a groove having a configuration of the perimeter of said plate and in which said plate is positioned in said groove.

5. The spring operated brake actuator defined in claim 1 in which said bearing member includes a fluid pressure seal element between said push member and said bearing member.

6. The spring operated brake actuator defined in claim 1 in which said mounting means includes a fluid pressure seal element between said mounting means and said bearing.

7. The spring operated brake actuator defined in claim 1 in which said bearing has a spherical surface and in which said mounting means has a surface portion complementary to and in abutting relation with said spherical surface.

8. The spring operated brake actuator defined in claim 7 in which said mounting means forms an annular groove in said surface portion and in which a sealing element is disposed in said groove and in sealing engagement with said spherical surface for all positions of angular displacement of said push member.

* * * * *